Oct. 23, 1934.  B. S. DAVIES ET AL  1,978,343
CONSTRUCTION OF RUBBER AND SPRING SEATS
Filed Nov. 7, 1933   2 Sheets-Sheet 1
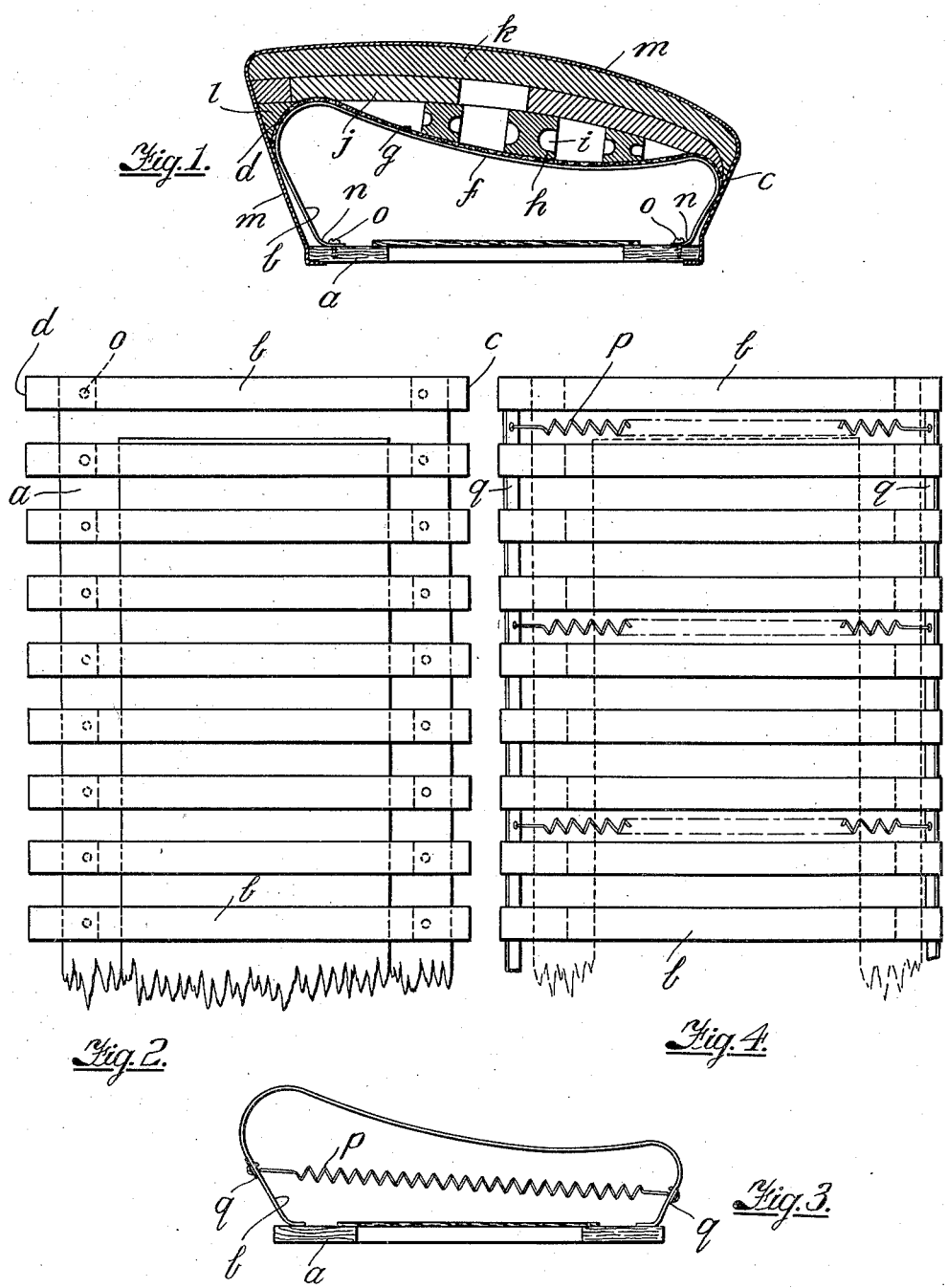
INVENTORS
BOB S. DAVIES
BENJAMIN WRIGLEY
By
ATTORNEY Oct. 23, 1934.     B. S. DAVIES ET AL     1,978,343
CONSTRUCTION OF RUBBER AND SPRING SEATS
Filed Nov. 7, 1933     2 Sheets-Sheet 2

INVENTORS
BOB S. DAVIES
BENJAMIN WRIGLEY
By
ATTORNEY

Patented Oct. 23, 1934

1,978,343

UNITED STATES PATENT OFFICE

1,978,343

CONSTRUCTION OF RUBBER AND SPRING SEATS

Bob Sydney Davies, Horsell Rise, Woking, and Benjamin Wrigley, St. Margarets, Kingfield, Woking, England, assignors to Sorbo Limited, Woking, England, a company of Great Britain Application November 7, 1933, Serial No. 697,040 In Great Britain October 8, 1932

5 Claims. (Cl. 155—179)

This invention relates to the construction of seats for use in upholstered furniture, vehicles, theatres, aircraft and like purposes to these and the object of the invention is to provide an improved form of resilient seating combining the advantages of sponge or cellular rubber construction with those of metal springs.

According to the invention a seat suitable for any of the purposes above described is constructed from a number of leaf springs formed and disposed in such manner as to form a cradle to support a superstructure consisting of a yielding, resilient or padded upholstery medium.

The invention also consists in a seat construction comprising a number of leaf springs each secured at its ends to a base and having an upper central portion of concave shape to form a seating for the reception of a structure composed of bars and a sheet or sheets of sponge rubber, expanded rubber or other suitable upholstery material.

Reference will now be made to the accompanying drawings which illustrate by way of example constructions according to the invention and in which:—

Figure 5:
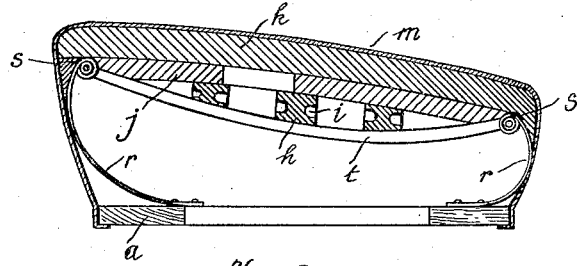
Figure 6:
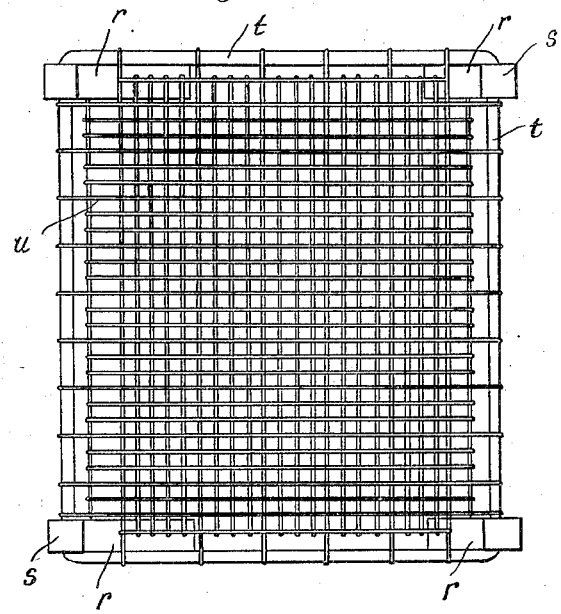
Figure 7:
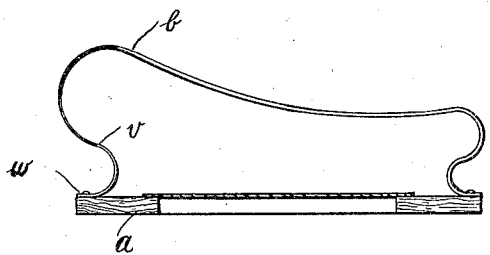

Figure 1 is a sectional elevation of a seat,

Figure 2 is a plan showing the arrangement of the springs in the seat shown in Figure 1, Figure 3 is an elevation of a modified arrangement of springs, Figure 4 is a plan of the arrangement of springs shown in Figure 3, Figure 5 is a sectional elevation of a modified seat construction, Figure 6 is a plan of the structure shown in Figure 5 with the India rubber super-structure removed and, Figure 7 is an elevation showing another arrangement of the supporting springs, Referring first to the construction illustrated in Figure 1, a seat for use in a vehicle, theatre, aircraft or for other upholstered furniture consists of a wooden or other framework $a$ constituting a base on which is mounted a spring steel cradle comprising a number of steel strips $b$ whose shape is such that the forward and rear edges of the seat marked $c$ and $d$ respectively incline outwardly, whilst the central portion $f$ of each spring is concave and lies between two zones defined by rounded shoulder portions formed at the points $c$ and $d$.

A number of springs formed to this shape are assembled side by side, on the framework $a$ as shown in Figure 2, the arrangement forming a cradle or means having an upper dished surface on which is superimposed a cellular sponge rubber structure. In forming this structure, the upper surfaces of the springs are covered with a layer $g$ of Hessian or like material to prevent contact between the India rubber and metal, and above the Hessian covering a structure is preferably formed from moulded sponge rubber bars of the construction described in our co-pending British application No. 28086/32. This structure comprises an arrangement of sponge rubber bars $h$ which are recessed as shown at $i$ in their sides to produce in each bar a girder-like formation. These bars extend at intervals as shown transversely across the concave or dished portions of the springs and above them is disposed either a similar arrangement of bars extending in a transverse direction or sheets $j$ of sponge rubber, the whole structure being covered with a sponge rubber sheet $k$ which is co-extensive with the area of the seat. This outer layer of sponge rubber is shaped at one longitudinal edge to conform with the usual practice in the formation of seatings, whilst at the other longitudinal edge, sponge rubber filling pieces $l$ are employed in the space formed between the shoulders $d$ of the springs $b$ and the rear edges of the sponge rubber sheet $k$. The assembly thus formed is completely enclosed by a covering $m$ of leather or any other upholstery material.

The springs $b$ may be anchored to the base $a$ in any convenient manner, their lower ends being bent inwardly at $n$ and perforated or otherwise shaped to enable them to be locked to the base. For this purpose screws $o$ may be employed or a metal fastening strap may engage the ends $n$ and be bolted to the base $a$ at points intermediate the ends of the springs.

As a further security against displacement during use, the ends $n$ of the springs may be anchored in grooves formed in the surface of the framework $a$ or the ends $n$ may be further provided with downwardly extending lugs or prongs which engage in the seat framework.

The structure described may be further strengthened by the employment of a number of coiled tension springs $p$ as shown in Figures 3 and 4. These springs extend from the front to the rear of the structure and are disposed between certain of the leaf springs $b$ the ends of the coiled springs being connected to bars or rods $q$ which extend along the outwardly inclined portions of the springs $b$ and are secured thereto by studs, rivets, or like means. These bars thus assist in maintaining the springs $b$ in their correct vertical positions, whilst the coiled springs afford an additional resilient resistance to a weight imposed upon the seat structure.

According to another modification, illustrated in Figures 5 and 6, only four leaf springs are employed disposed one at each corner of the seat. These springs $r$ do not extend from front to rear of the seat but terminate at points $s$ where they support the members $t$ of a steel tube or wire frame filled with wire mesh work $u$. On this mesh work, the sponge rubber portions of the seat are superimposed in the manner already described and the seat is finished with an outer cover as before.

Figure 7 shows another method of constructing and arranging the springs of the general character shown in Figure 1. In Figure 7 the ends of the springs are bent inwardly at $v$ and finally outwardly at $w$ to the points of fixture thus imparting to them an additional resiliency and resistance to impact and distortion.

Seats constructed according to any of the arrangements above described have the advantage of being non-collapsible and of retaining their shape under all conditions. The imposition of a weight upon the seat produces vertical compression but no lateral displacement, and owing to the shape of the supporting springs there is no likelihood of collapse of the front or rear walls of the seat. Further, owing to the concavity of the upper portions of the springs there is no liability of the padding medium shifting out of position either temporarily or permanently and there is no necessity for external framework or supporting devices to retain the upholstery portions in position upon the springs.

It is to be understood that although the invention has been particularly described above with reference to a sponge rubber superstructure any other padding or upholstery medium may be employed.

We claim:—

1. A seat construction having upholstery material, resiliently mounted means having an upper surface supporting said material at spaced zones, said surface being downwardly dished between said zones, and a series of compressible bars disposed at an angle to the direction of dishing of said surface, said bars being graduated in height with the highest bar located between the outermost bars, the construction serving to prevent said compressible bars from unduly creeping toward said zones.

2. A seat construction having upholstery material, resiliently mounted means having an upper surface supporting said material at spaced zones adjacent the front and rear, said surface being downwardly dished between said zones whereby a space is provided between the dished portion of said surface and said upholstery material, and a rubber upholstery means in said space prevented from undue creeping toward the front and rear of the seat construction by the dishing of said surface.

3. A seat construction having upholstery material, a series of spring bars each having elevated portions supporting said material at spaced zones, said bars being downwardly dished between said zones, and resilient bar material between said zones and intermediate said upholstery material and said surface prevented from undue creeping toward said zones by the downward dishing of said spring bars.

4. A seat construction having upholstery material of rubber, a series of spring bars each having elevated portions supporting said rubber at spaced zones, said spring bars being downwardly dished between said zones, whereby a space is provided between the dished portions and said rubber, rubber upholstery means in said space prevented from undue creeping toward said zones by the downward dishing of said spring bars, a base, terminal portions on said bars supported on said base and a covering over said rubber upholstery means secured to said base.

5. A seat construction having upholstery material of rubber, a frame, a base, spring means mounting said frame on said base, filling material bridging the frame, said frame supporting said rubber at spaced zones, said frame and filling being downwardly dished between said zones whereby a space is provided between the same and said rubber, and rubber upholstery means in said space, the downward dishing of said frame serving to prevent said rubber upholstery means from unduly creeping toward said zones.

BOB SYDNEY DAVIES.
BENJAMIN WRIGLEY.